(12) United States Patent
Roman et al.

(10) Patent No.: US 11,745,429 B2
(45) Date of Patent: Sep. 5, 2023

(54) HUMIDIFICATION IN A BUILD MATERIAL RECOVERY SYSTEM

(71) Applicant: HEWLETT-PACKARD DEVELOPMENT COMPANY, L.P., Spring, TX (US)

(72) Inventors: Justin M. Roman, Vancouver, WA (US); Luke P. Sosnowski, Vancouver, WA (US)

(*) Notice: Subject to any disclaimer, the term of this patent is extended or adjusted under 35 U.S.C. 154(b) by 154 days.

(21) Appl. No.: 16/607,545

(22) PCT Filed: Apr. 25, 2018

(86) PCT No.: PCT/US2018/029362
§ 371 (c)(1),
(2) Date: Oct. 23, 2019

(87) PCT Pub. No.: WO2019/209288
PCT Pub. Date: Oct. 31, 2019

(65) Prior Publication Data
US 2021/0362422 A1 Nov. 25, 2021

(51) Int. Cl.
| | |
|---|---|
| *B29C 64/357* | (2017.01) |
| *B29C 64/314* | (2017.01) |
| *B33Y 40/10* | (2020.01) |
| *B29C 64/255* | (2017.01) |
| *B33Y 40/00* | (2020.01) |

(52) U.S. Cl.
CPC .......... *B29C 64/357* (2017.08); *B29C 64/255* (2017.08); *B29C 64/314* (2017.08); *B33Y 40/00* (2014.12); *B33Y 40/10* (2020.01)

(58) Field of Classification Search
CPC ...... B28B 1/001; B29C 64/314; B29C 64/357
See application file for complete search history.

(56) References Cited

U.S. PATENT DOCUMENTS

| | | | |
|---|---|---|---|
| 5,000,624 A | 3/1991 | Steiger | |
| 5,156,498 A | 10/1992 | Nomura et al. | |
| 11,097,471 B2 * | 8/2021 | Gunther | B33Y 30/00 |
| 2009/0206522 A1 | 8/2009 | Hein et al. | |
| 2017/0106595 A1 | 4/2017 | Gunther et al. | |
| 2018/0003545 A1 * | 1/2018 | Poole | G01G 13/24 |
| 2018/0021855 A1 | 1/2018 | De Lajudie et al. | |

FOREIGN PATENT DOCUMENTS

| | | |
|---|---|---|
| CN | 101493254 B | 6/2010 |
| EP | 3000484 A3 | 6/2016 |
| JP | 2013203485 A | 10/2013 |
| WO | WO2017196383 A1 | 11/2017 |

* cited by examiner

*Primary Examiner* — Russell E Sparks
(74) *Attorney, Agent, or Firm* — Shook, Hardy & Bacon, L.L.P.

(57) ABSTRACT

In one example, a build material recovery system for additive manufacturing includes: a receiving station to receive a portable container containing a build material; a separator to remove build material from a stream of air; a first conduit to carry build material in the stream of air from the receiving station to the separator; a source of negative air pressure to pull the stream of air with the build material through the first conduit from the receiving station to the separator; a humidifier to add moisture to the stream of air; and a second conduit to carry build material from the separator to the receiving station.

5 Claims, 5 Drawing Sheets

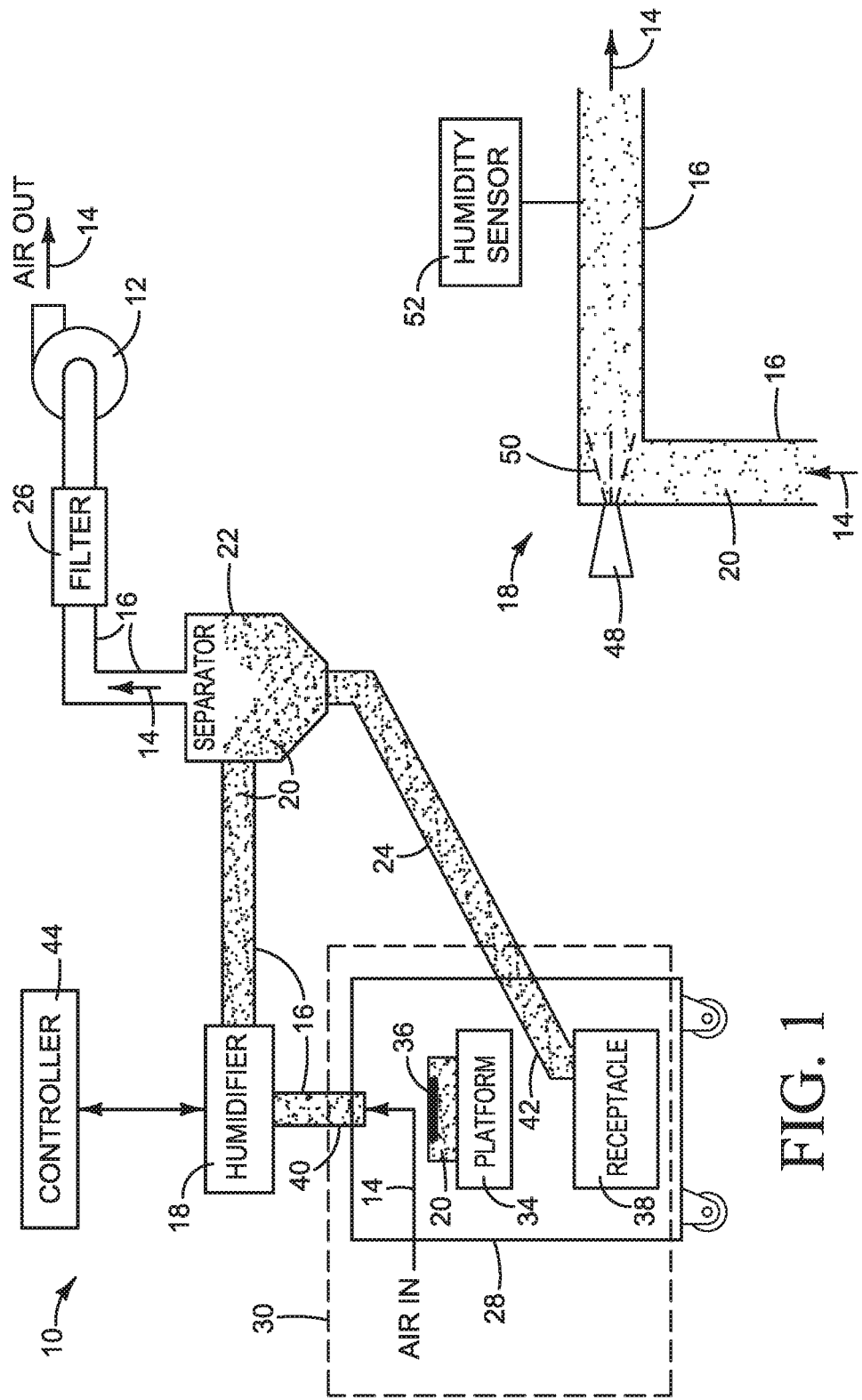

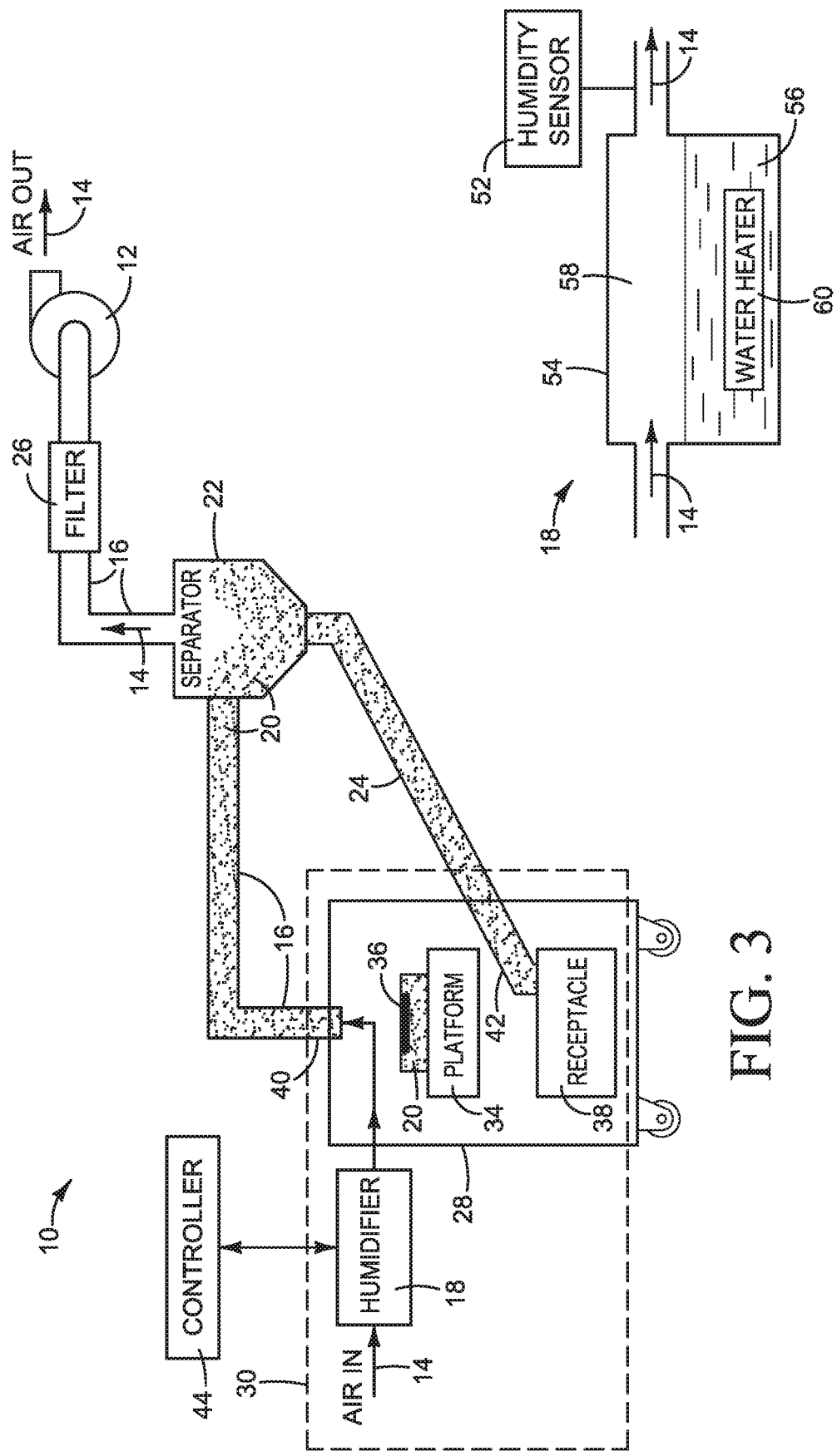

HUMIDIFICATION IN A BUILD MATERIAL RECOVERY SYSTEM

BACKGROUND

Additive manufacturing machines produce 3D (three-dimensional) objects by building up layers of material. Some additive manufacturing machines are commonly referred to as "3D printers." 3D printers and other additive manufacturing machines convert a digital representation of an object into the physical object. The digital representation may be processed into slices each defining that part of a layer or layers of build material to be formed into the object.

DRAWINGS

FIG. 1 illustrates one example of a build material recovery system to recover build material used in an additive manufacturing machine.

FIG. 2 illustrates one example of a humidifier such as might be used in the recovery system shown in FIG. 1.

FIG. 3 illustrates another example of a build material recovery system to recover build material used in an additive manufacturing machine.

FIG. 4 illustrates one example of a humidifier such as might be used in the recovery system shown in FIG. 3.

The same part numbers designate the same or similar parts throughout the figures.

DESCRIPTION

Figure 5:
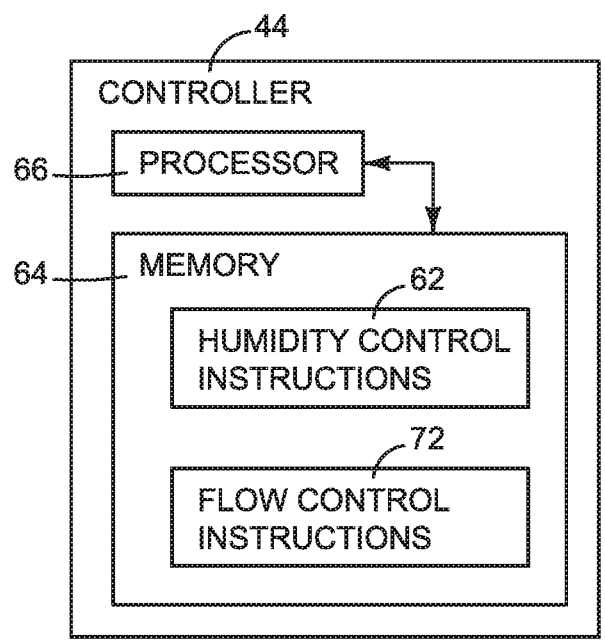
FIG. 5 illustrates one example of a controller in a build material recovery system shown in FIGS. 1 and 3.

In some additive manufacturing machines, powdered build materials are used to form a solid object. Particles in each of many successive layers of build material powder are fused in a desired pattern to form the object. The completed object is usually surrounded by unfused powder that may be recovered for re-use. Some additive manufacturing systems utilize a stand-alone build material recovery system, separate from the manufacturing machine, to recover unfused build material. Used build material powder may be transported pneumatically through the system during the recovery process. One of the challenges of transporting powdered build material pneumatically is managing electrical surface charges on the powder. Surface charges on the small particles of the powdered build material can be large enough to cause the powder to behave in unpredictable or otherwise undesirable ways. Electrical surface charges dissipate more easily in humid air to better mitigate the undesirable effects of surface charges on the build material powder.

Accordingly, a new build material recovery system has been developed in which moisture is added to the transport air for better powder flow. In one example, the recovery system includes a receiving station to receive a cart or other portable container containing a build material, a separator to remove build material from a stream of air, a first conduit to carry build material in the stream of air from the receiving station to the separator, a source of negative air pressure to pull the stream of air with the build material through the first conduit to the separator, a humidifier to add moisture to the stream of air, and a second conduit to carry build material from the separator to a loading port at the receiving station.

Examples are not limited to powdered build materials but may be used to help control the flow of other forms of pneumatically transported build materials including, for example, fibers and powder/fiber composites. The examples described herein illustrate but do not limit the scope of the patent, which is defined in the Claims following this Description.

As used in this document, "and/or" means one or more of the connected things; a "memory" means any non-transitory tangible medium that can embody, contain, store, or maintain information and instructions for use by a processor and may include, for example, circuits, integrated circuits, ASICs (application specific integrated circuits), hard drives, random access memory (RAM), read-only memory (ROM), and flash memory; and "negative pressure" means a pressure lower than ambient pressure.

FIG. 1 illustrates one example of a build material recovery system 10 to recover build material used in an additive manufacturing machine. Referring to FIG. 1, recovery system 10 includes a blower or other source of air pressure 12 to pull a stream of air 14 through conduits 16. System 10 also includes a humidifier 18 to add moisture to air stream 14 carrying build material 20 and a separator 22 to remove build material 20 from air 14. In this example, build material 20 separated from air 14 falls into to a discharge chute 24. A filter 26 may be used ahead of blower 12 to remove any residual build material from air stream 14.

In operation, a portable build material container 28 is positioned at a receiving station 30 in system 10. In this example, container 28 is implemented as a cart 28 that contains a build platform 34 on which as object 36 has been manufactured using build material 20. Receiving station 30 is represented with dashed lines in FIG. 1 to not obscure cart 28. Cart 28 also includes a receptacle 38 to hold build material used to manufacture an object 36. Receiving station 30 includes a hose or other suitable unloading port 40 through which build material 20 may be removed from container 28 and a hose or other suitable loading port 42 through which build material 20 may be added to container 28. Unfused build material 20 surrounding object 36 is pulled into a conduit 16 through loading port 40 at the urging of blower 12. Object 36 is dislodged from surrounding unfused build material 20 in an "uncaking" process and the unfused build material 20 vacuumed into recovery system 10. Humidifier 18 adds moisture to build material 20 in conduit 16 upstream from separator 22. Build material 20 recovered at separator 22 is loaded into receptacle 38 in container 28 through chute 24 and loading port 42.

In this example, system 10 includes a controller 44 is operatively connected to humidifier 18. Controller 44 represents the programming, processing and associated memory resources, and the other electronic circuitry and components to control the flow of build material 20 through conduit 16. In particular, controller 44 may include programming to regulate the rate at which moisture is added to build material 20 to maintain the humidity within a desired range.

FIG. 2 illustrates one example of a humidifier 18 such as might be used in a recovery system 10 shown in FIG. 1. Referring to FIG. 2, humidifier 18 includes a vaporizer 48 to introduce water vapor 50 into build material 20 as it moves through conduit 16 in air stream 14. In this example, humidifier 18 also includes a humidity sensor 52 to measure the humidity of air stream 14 immediately downstream from vaporizer 48.

FIG. 3 illustrates another example of a build material recovery system 10 to recover build material used in an additive manufacturing machine. In the example shown in FIG. 3, a humidifier 18 adds moisture to air stream 14 at receiving station 30. The humidified air is pulled into unloading port 40 along with build material 20 from platform 34 in a container 28.

FIG. 4 illustrates one example of a humidifier 18 such as might be used in recovery system 10 shown in FIG. 3. Referring to FIG. 4, humidifier 18 includes a chamber 54 holding a pool of water 56. Chamber 54 forms an air plenum 58 over water 56. Air in stream 14 is exposed to water 56 as it passes through plenum 58 where it can take-up moisture before build material is introduced into the air stream. Humidifier 18 may include a water heater 60 to heat water 56 and a humidity sensor 52 to measure the humidity of air stream 14 immediately downstream from moisturizing chamber 54.

The humidity of air in stream 14 may be regulated by adjusting the rate at which moisture is introduced in to the air stream, for example at the direction of a controller 44 operatively connected to a humidifier 18 with a humidity sensor 52. In the example shown in FIG. 5, humidity control programming is implemented through instructions 62 residing on a controller memory 64 for execution by a processor 66. Controller 44 operatively connected to vaporizer 48 (FIG. 2) or water heater 60 (FIG. 4) adjusts the rate at which moisture is added to air stream 14 to maintain the desired humidity based on feedback from humidity sensor 52.

Figure 6:
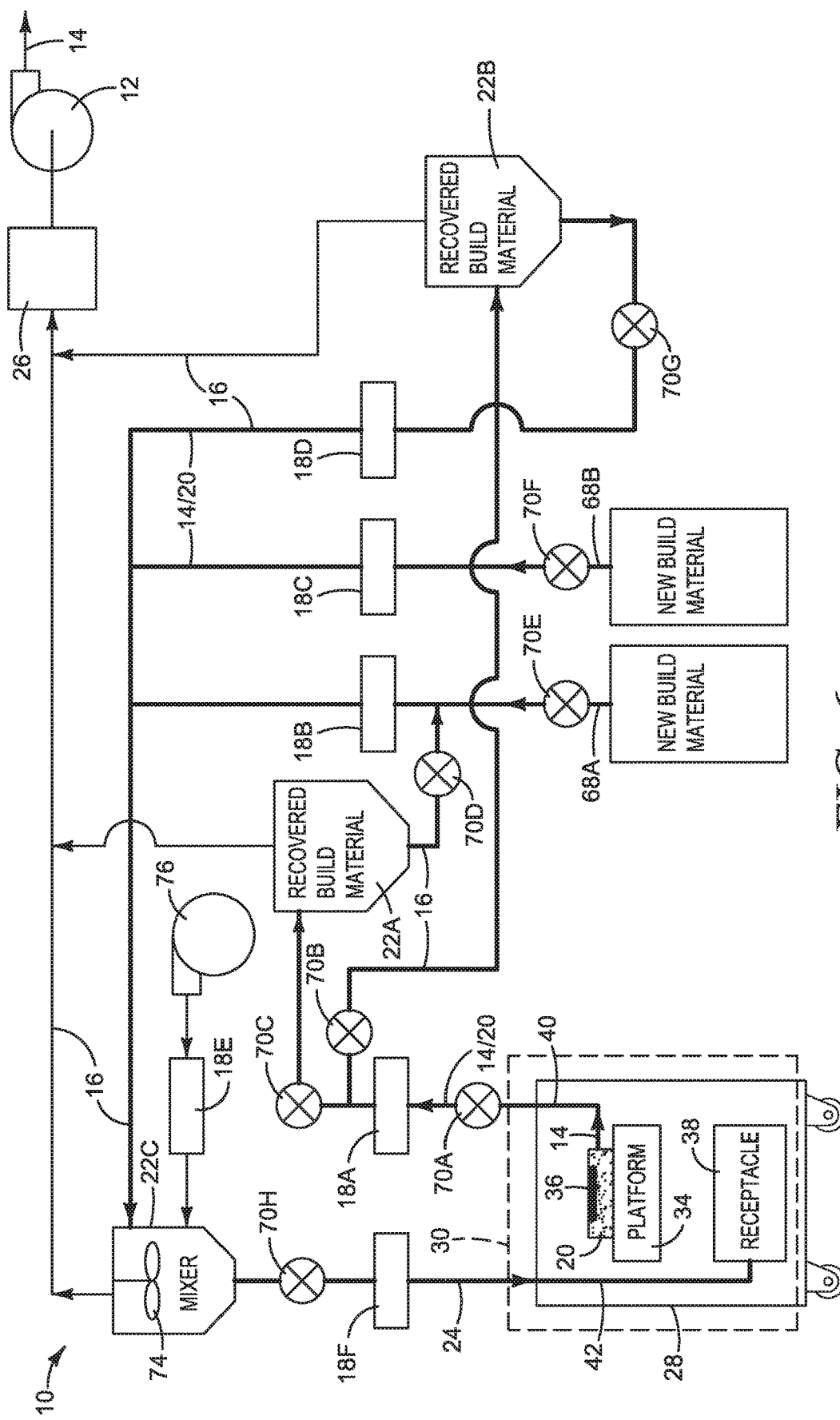
FIG. 6 illustrates another example of a of a build material recovery system to recover build material used in an additive manufacturing machine.

FIG. 6 illustrates another example of a of a build material recovery system 10 to recover build material used in an additive manufacturing machine. Referring to FIG. 6, recovery system 10 includes a blower or other source of air pressure 12 to pull a stream of air 14 through an array of conduits 16 connecting blower 12 to an unloading port 40, a first separator 22A, a second separator 22B, first and second supply ports 68A, 68B through which new build material may be introduced into the recovery system, a third separator 22C, and loading port 42. Arrows indicate the direction of air flow in FIG. 6. The presence of build material in conduits 16 during operation is indicated by a heavier line weight.

An array of valves 70A-70H control the flow of air/build material among unloading port 40, separators 22A-22C, new build material supplies 68A, 68B, and loading port 42. Flow control valves 70A-70H may be operated to achieve the desired flow, for example at the direction of a controller 44 executing flow control instructions 72 (FIG. 5). In this example, separator 22C includes a mixing blade or other suitable device 74 to help achieve the desired mixing of recovered and new build materials before discharge to loading port 42. Also, each separator 22A-22C may include a reservoir to hold recovered build material recovered from one or more container platforms 34 to load into another, subsequently received container receptacle 38.

Recovery system 10 in FIG. 6 includes an array of humidifiers 18A-18F to add moisture to air stream 14 carrying build material 20, to help improve the flow of build material from unloading port 40 through separators 22A-22C to loading port 42 and to help maintain the humidity of build material loaded into receptacle 38 at the desired level for subsequent use. Where it is desired to add moisture to separator/mixer/reservoir 22C, a fan 76 may be used to push air through humidifier 18E into reservoir 74. The humidity of air 14 affects the characteristics of recovered and new build material 20 flowing through recovery system 10. If the relative humidity of the transport air is too low, build material may charge and clump. If the relative humidity of the transport air is too high, condensation may occur in conduits 16 and the other components of recovery system 10. Although the level of humidity to achieve the desired flow characteristics for build material 20 may vary depending on the type of the build material and other system parameters, testing indicates that a humidity in the range of 55% relative humidity at 25° C. to 75% relative humidity at 35° C. allows electrical surface charges on a polyamide 12 (PA12) build material 20 to dissipate more easily compared to lower humidity, to help mitigate the undesirable effects of surface charges on the build material. Also, build material 20 may be loaded into receptacle 38 at the desired humidity to improve subsequent handling in an additive manufacturing machine. Where build material 20 may be held temporarily in separator 22C, a humidifier 18F enables loading humidified build material 20 into a receptacle 38 even if some moisture is lost during interim storage.

Figure 7:
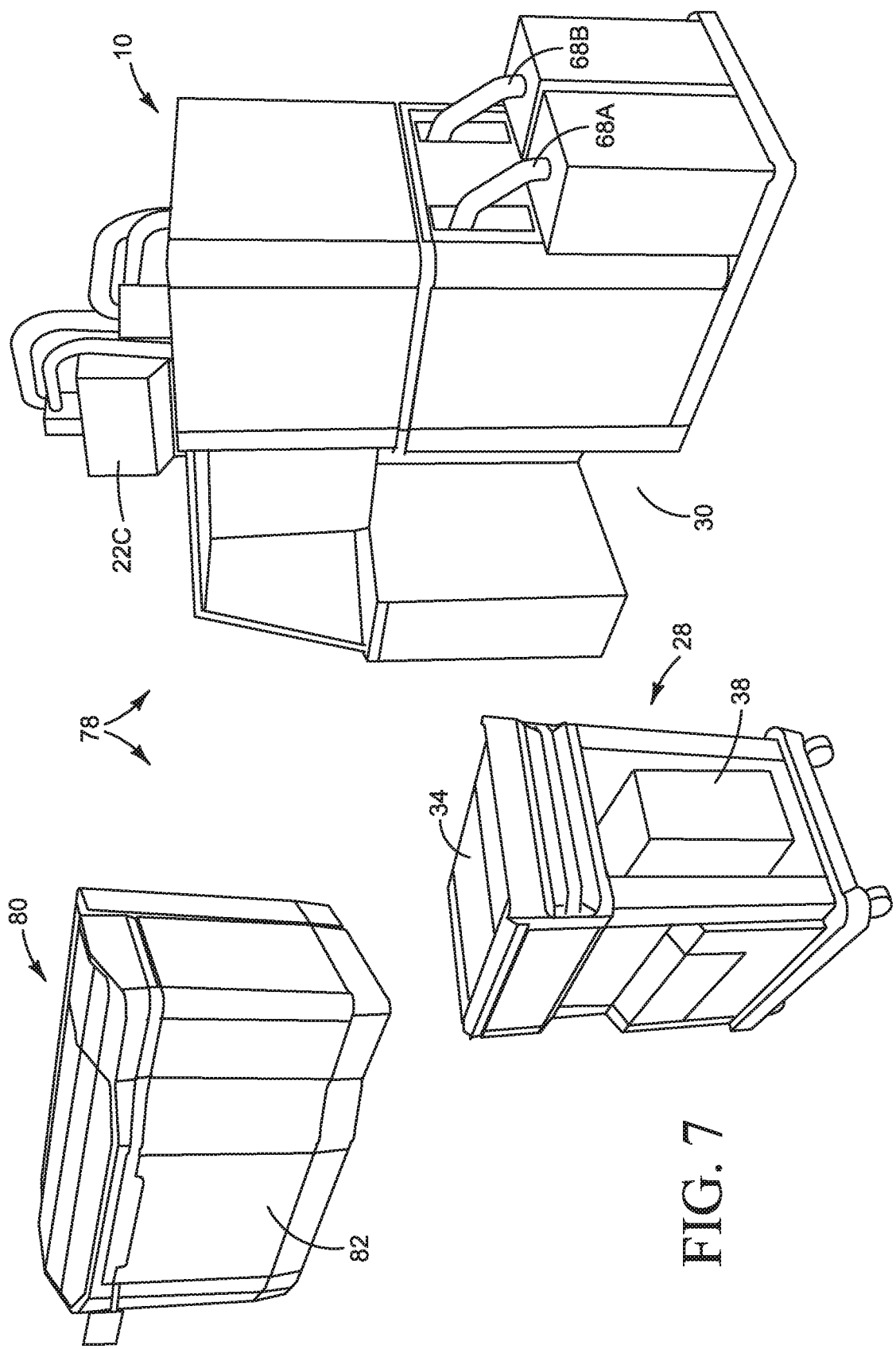
FIG. 7 illustrates an additive manufacturing system implementing one example of a build material recovery system.

FIG. 7 illustrates one example of an additive manufacturing system 78 implementing a build material recovery system 10 such as that shown in FIG. 1, 3, or 6. Referring to FIG. 7, manufacturing system 10 includes an additive manufacturing machine 80, a cart 28 with a build platform 34 and build material receptacle 38, and a recovery system 10. Cart 28 is operatively connected to manufacturing machine 80 at a receiving station 82 during manufacturing of an object 36 (FIGS. 1, 3, and 6). Cart 28 is removed from machine 80 and transferred to recovery system 10 to recover unfused build material 20 and to load receptacle 38, as described above.

As noted at the beginning of this Description, the examples shown in the figures and described above illustrate but do not limit the scope of the patent. Other examples are possible. Therefore, the foregoing description should not be construed to limit the scope of the patent, which is defined in the following Claims.

"A" and "an" as used in the Claims means one or more.

The invention claimed is:

1. A build material recovery system for additive manufacturing, the system consisting of:
   a receiving station to receive a portable container containing a build material;
   a separator to remove build material from a stream of air;
   a first conduit to carry build material in the stream of air from the receiving station to the separator;
   a source of negative air pressure to pull the stream of air with the build material through the first conduit from the receiving station to the separator;
   a humidifier to add moisture to the stream of air;
   a second conduit to carry build material from the separator to the receiving station; and
   optionally, the portable container to contain the build material for additive manufacturing.

2. The system of claim 1, where the humidifier is to add moisture to the stream of air in the first conduit.

3. The system of claim 1, where:
   the receiving station includes an unloading port through which build material powder may be recovered from a container in the receiving station and a loading port through which build material powder may be added to a container in the receiving station;
   the first conduit is to carry build material in the stream of air from the unloading port to the separator;
   the second conduit is to carry build material from the separator to the loading port; and the humidifier is to add moisture to the stream of air entering the unloading port at the receiving station and/or to build material in the second conduit.

4. The system of claim 1, where the humidifier is to add moisture to build material in the separator.

5. The system of claim 1, where the humidifier is to add moisture to the stream of air in the first conduit and to build material in the separator.

* * * * *